(12) United States Patent
Ho et al.

(10) Patent No.: US 8,155,234 B2
(45) Date of Patent: Apr. 10, 2012

(54) METHOD FOR PROCESSING A DATA SIGNAL, DATA PROCESSING UNIT AND COMPUTER PROGRAM PRODUCT

(75) Inventors: Chin Keong Ho, Singapore (SG); Sumei Sun, Singapore (SG); Ho Wang Fung, Singapore (SG); Chin Ming Pang, Singapore (SG); Zhaohui Cai, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 254 days.

(21) Appl. No.: 12/279,536

(22) PCT Filed: Feb. 14, 2007

(86) PCT No.: PCT/SG2007/000048
§ 371 (c)(1),
(2), (4) Date: May 17, 2010

(87) PCT Pub. No.: WO2007/094745
PCT Pub. Date: Aug. 23, 2007

(65) Prior Publication Data
US 2010/0220815 A1    Sep. 2, 2010

Related U.S. Application Data

(60) Provisional application No. 60/774,251, filed on Feb. 16, 2006.

(51) Int. Cl.
*H04B 7/02* (2006.01)
(52) U.S. Cl. ...................................................... 375/267
(58) Field of Classification Search ................... 375/267
See application file for complete search history.

(56) References Cited

U.S. PATENT DOCUMENTS

2008/0279091 A1* 11/2008 Zhang et al. ................. 370/210
2011/0150145 A1*  6/2011 Tsai ............................. 375/340

OTHER PUBLICATIONS

Strassen, "Gaussian Elimination is not Optimal", Dec. 12, 1968.
Younis, et al., "Efficient Adaptive Receivers for Joint Equalization and Interference Cancellation in Multiuser Space-Time Block-Coded Systems", Nov. 11, 2003.
Younis et al., "MIMO Space-Time Block Coded Receivers over Frequency Selective Fading Channels", 2004.
Office Action for Japanese Application No. 2008-555200, mailed Oct. 20, 2011, with English translation (10 pages).
Balle, Susanne, et al., "A Strassen-Type Matrix Inversion Algorithm," draft, PaA2 Deliverable APPARC ESPIRIT Contract, 1993 (26 pages).

* cited by examiner

*Primary Examiner* — Don N Vo
(74) *Attorney, Agent, or Firm* — Choate, Hall & Stewart, LLP

(57) ABSTRACT

A method for processing a data signal received via a communication channel is described, comprising determining a first matrix comprising components describing characteristics of the communication channel and inverting the first matrix by sub-dividing the first matrix into at least four sub matrices, inverting a first sub matrix of the four sub matrices generating a second matrix by multiplying a second sub matrix of the four sub matrices with the inverted first matrix and a third sub matrix of the four sub matrices, determining the difference matrix between the second matrix and a fourth sub matrix of the four sub matrices inverting the difference matrix and calculating the inverted matrix based on the inverted difference matrix. The data signal is processed using the inverted first matrix.

18 Claims, 3 Drawing Sheets

METHOD FOR PROCESSING A DATA SIGNAL, DATA PROCESSING UNIT AND COMPUTER PROGRAM PRODUCT

RELATED APPLICATIONS

The present application claims the benefit of U.S. provisional application 60/774,251, filed 16 Feb. 2006, the entire contents of which is incorporated herein by reference for all purposes.

SUMMARY

The invention relates to a method for processing a data signal, a data processing unit for processing a data signal and a computer program product.

Space time block coding (STBC) is a technique for transmitting data used in wireless communication systems where multiple copies of the same data stream are sent using a plurality of antennas. In a group space time block coding (GSTBC) system, there are groups of antennas wherein each group of antennas transmits one data stream and the antennas of one group transmit the same data stream. At the expense of using more transmit antennas a performance improvement in terms of packet error rate (PER) may be achieved compared to multiple input multiple output (MIMO) systems where also a plurality of data streams are transmitted in parallel but one data stream is only transmitted using a single antenna.

For example, a GSTBC system with a two dimensional (2D) interleaver outperforms the OFDM system according to IEEE 802.11a when the SNR (signal to noise ratio) is greater than 26 dB even with a data rate that is 3 times higher.

However, the complexity of a receiver for a GSTBC system is significantly larger as compared to a conventional single antenna system even when linear detectors are employed.

An object of the invention is to provide an improved method for detecting data signals received via a communication channel.

The object is achieved by a method for processing a data signal, a data processing unit for processing a data signal and a computer program product with the features according to the independent claims.

A method for processing a data signal received via a communication channel is provided, comprising
  determining a first matrix comprising components describing characteristics of the communication channel
  inverting the first matrix by
    sub-dividing the first matrix into at least four sub matrices
    inverting a first sub matrix of the four sub matrices
    generating a second matrix by multiplying a second sub matrix of the four sub matrices with the inverted first matrix and a third sub matrix of the four sub matrices
    determining the difference matrix between the second matrix and a fourth sub matrix of the four sub matrices
    inverting the difference matrix
    calculating the inverted matrix based on the inverted difference matrix
  processing the data signal using the inverted first matrix.

Further, a data processing unit for processing a data signal and a computer program product according to the method for processing a data signal described above are provided.

Illustratively, for generating a matrix for processing the received data signal, for example for generating a filter matrix, the first matrix characterizing the communication channel, for example a channel matrix comprising components characterizing the transmission characteristics of the communication channel, is inverted using a matrix inversion approach that allows to reduce the number of multiplications necessary for matrix inversion and signal processing compared with conventional methods.

The data processing unit is for example used in a receiver, for example the receiver of a 6×3 (6 transmit antennas, 3 receiver antennas) MIMO (multiple input multiple output) WLAN (wireless local area network) system. The data signal may for example be transmitted and received via a communication system according to WLAN 11a, WLAN 11g, WLAN 11n, Super 3G, HIPERLAN 2, WIMAX (Worldwide Interoperability for Microwave Access) and B3G (beyond 3G) or other communication systems.

Embodiments of the invention emerge from the dependent claims. The embodiments which are described in the context of the method for processing a data signal are analogously valid for the data processing unit for processing a data signal and the computer program product.

In one embodiment of the invention, the first matrix is inverted according to Strassen's method for matrix inversion.

The communication channel is for example a radio communication channel. The received data signal is for example processed for estimating a sent data signal that was received as the received data signal. In one embodiment, the sent data signal is transmitted using a plurality of transmit antennas. For example, the sent data signal is transmitted according to Groupwise Space Time Block Code. The sent data signal may be transmitted using OFDM modulation.

In one embodiment, at least one of the four sub matrices has Alamouti structure. For example, the first matrix consists of sub matrices having Alamouti structure. A sub matrix having Alamouti structure can be easily inverted and allows a further decrease of complexity compared to a direct approach for matrix inversion for example by solving a linear equation system.

In one embodiment, the inverted matrix is used for performing a filter operation on the received data signal. The received data signal is for example linearly filtered using the inverted matrix. The received data signal may be filtered according to a zero forcing interference suppression method, a linear minimum mean squared error detection method or an interference cancellation method.

The first matrix is for example generated from a channel matrix modelling the transmission characteristics of the communication channel. The first matrix may for example be sub matrix of the channel matrix or the first matrix may be the channel matrix itself. The first matrix may also be a product of matrices with one factor being the channel matrix or the hermitian of the channel matrix.

BRIEF DESCRIPTION OF THE DRAWINGS

Illustrative embodiments of the invention are explained below with reference to the drawings.

DETAILED DESCRIPTION

Figure 1:
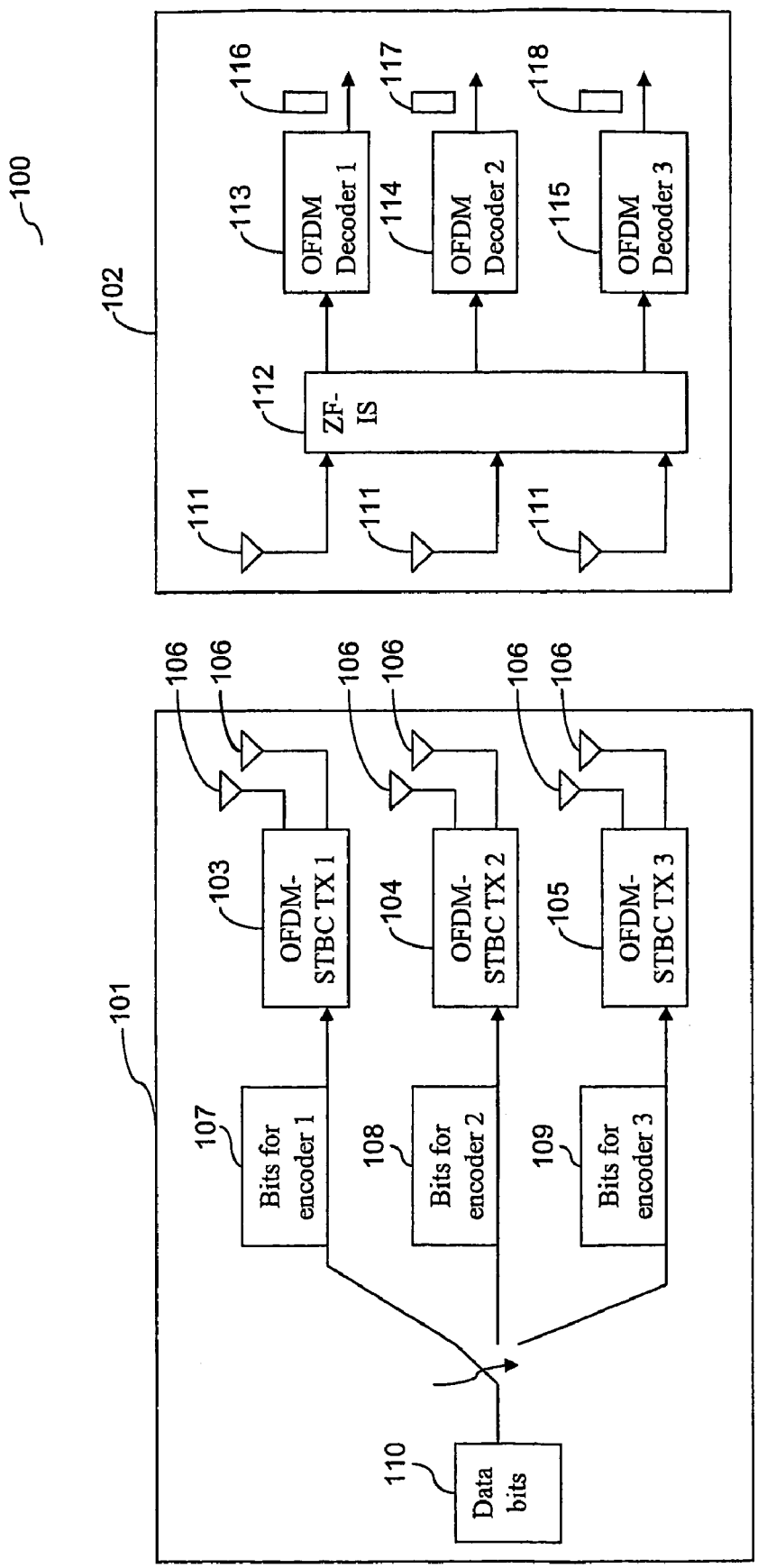
FIG. 1 shows a communication system according to an embodiment of the invention.

FIG. 1 shows a communication system 100 according to an embodiment of the invention. The communication system 100 comprises a transmitter 101 and a receiver 102.

The transmitter 101 is a GSTBC (Groupwise space time block coding) transmitter comprising a plurality of STBC transmitter groups 103, 104, 105, in this example a first STBC transmitter group 103, a second STBC transmitter group 104 and a third STBC transmitter group 105. The number of STBC transmitter groups 103, 104, 105 is denoted by $L_g$. In this example $L_g=3$.

The transmitter 101 comprises a plurality of transmit antennas 106. The number of transmit antennas 106 is denoted by $L_t$. In this embodiment, each STBC transmitter group uses $L_t/L_g$ transmit antennas 106. It is not necessary that each STBC transmitter groups uses the same number of transmit antennas. In other embodiments, the STBC transmitter groups use different numbers of transmit antennas.

The first STBC transmitter group 103 receives as input a first data stream 107, generates STBC codewords from the first data stream 107 and sends the STBC codewords using OFDM (orthogonal frequency division multiplexing) and using $L_t/L_g$ transmit antennas 106. Each antenna used by the first STBC transmitter group 103 sends the same signal.

The second STBC transmitter group 104 receives as input a second data stream 108, generates STBC codewords from the second data stream 108 and sends the STBC codewords using OFDM (orthogonal frequency division multiplexing) and using $L_t/L_g$ transmit antennas 106. Each antenna used by the second STBC transmitter group 104 sends the same signal.

The third STBC transmitter group 105 receives as input a third data stream 109, generates STBC codewords from the third data stream 109 and sends the STBC codewords using OFDM (orthogonal frequency division multiplexing) and using $L_t/L_g$ transmit antennas 106. Each antenna used by the third STBC transmitter group 105 sends the same signal.

In this way, the first data stream 107, the second data stream 108 and the third data stream 109 are sent in parallel. Altogether, the STBC transmitter groups 103, 104, 105 send data 110 being separated into the data streams 107, 108, 109. For example, each data stream 107, 108, 109 corresponds to a different user that wants to transmit the respective data stream 107, 108, 109.

In one embodiment, the transmitter 101 comprises one or more coded modulation units for encoding the data 110 such that the data streams 107, 108, 109 are, for example convolutionally encoded, bit-interleaved, and modulated to MQAM (M-order quadrature amplitude modulation) signals. The data streams 107, 108, 109 may be bit streams, e.g. to be transmitted using BPSK (binary phase-shift keying) or streams of symbols, e.g. to be transmitted using QPSK (quadrature phase-shift keying) or QAM (quadrature amplitude modulation).

The receiver 102 comprises receive antennas 111. The number of receive antennas 111 is denoted by $L_r$. In one embodiment $L_r \geq L_g$. In the following, it is assumed that $L_r = L_g$ such that the minimum number of receive antennas 111, in this example 3, is used. This is for example of advantage if the receiver 102 should be kept small, for example when the receiver 102 is integrated in a mobile device, such as a cell phone.

The signals received by the receive antennas 111 are fed into a filter unit 112 which generates filtered bit streams that are respectively fed into a first OFDM decoder 113, a second OFDM decoder 114 and a third OFDM decoder 115. The first OFDM decoder 113 generates a first received bit stream 116, The second OFDM decoder 114 generates a second received bit stream 117 and the third OFDM decoder 115 generates a third received bit stream 118.

In the embodiment described in the following, an Alamouti's code is used. Therefore, $L_t/L_g=2$ and full rate transmission is achieved. More antennas can be employed to allow further diversity and higher system performance. The embodiment described in the following can be extended to such cases.

A STBC transmitter group 103, 104, 105 forms data vectors form the respective data stream 107, 108, 109. A data vector formed by one STBC transmitter group 103, 104, 105 from the respective bit streams 107, 108, 109 is denoted by $$\underline{x}_g = \begin{bmatrix} X_g^0 \\ -X_g^{1*} \end{bmatrix}$$

where $g=1, \ldots, L_g$ is the number of the respective STBC transmitter group 103, 104, 105. When $\underline{x}_g$ has been transmitted (in one transmission step), as will be explained in the following, the STBC transmitter group 103, 104, 105 forms the next data vector.

The data vectors data vectors $\underline{x}_g$ can be written together in the form of the vector $$\underline{x} = \begin{bmatrix} \underline{x}_1 \\ \vdots \\ \underline{x}_{L_g} \end{bmatrix}$$

which corresponds to the data transmitted in one transmission step by the STBC transmitter groups 103, 104, 105.

The data received by the receiver 102 in one transmission step, i.e. when the vector $\underline{x}$ is transmitted, is written as $$\underline{r} = \begin{bmatrix} \underline{r}_1 \\ \vdots \\ \underline{r}_{L_g} \end{bmatrix} \text{ where } \underline{r}_r = \begin{bmatrix} R_r^0 \\ -R_r^{1*} \end{bmatrix}.$$

The relation between the sent data vector $\underline{x}$ and the received data vector $\underline{r}$ can be modelled as $$\underline{r} = \underline{H}\underline{x} + \underline{n} \qquad (1)$$

where $\underline{n}$ models independent average white Gaussian noise (AWGN) with zero mean and with variance $\sigma_n^2$. The matrix $\underline{H}$ is called channel matrix and is defined by $$\underline{H} = \begin{bmatrix} H_{11} & \cdots & H_{1,L_g} \\ \vdots & \ddots & \vdots \\ H_{L_g,1} & \cdots & H_{L_g,L_g} \end{bmatrix}, \qquad (2)$$

$$H_{gr} = \begin{bmatrix} H_{gr}^0 & H_{gr}^1 \\ -H_{gr}^{1*} & H_{gr}^{0*} \end{bmatrix}$$

where $H_{gr}^t$ ($t=0, 1$ for the two antennas of each STBC transmitter group 103, 104, 105) models the transmission characteristics of the (frequency domain) channel between the $t^{th}$ antenna 106 of the $g^{th}$ STBC transmitter group 103, 104, 105 and the $r^{th}$ receive antenna 111.

The sub matrices $\underline{H}_{gr}$ of matrix $\underline{H}$ are called channel sub matrices. They have a special structure given by $$\begin{bmatrix} h_0 & h_1 \\ -h_1^* & h_0^* \end{bmatrix} \quad (3)$$

where $h_0$, $h_1$ are complex numbers. A matrix having such a structure is called Alamouti matrix in the following. For an Alamouti matrix $\underline{H}$, a vector $\underline{h}$ can be defined according to the following correspondence:

$$\underline{H} = \begin{bmatrix} h_0 & h_1 \\ -h_1^* & h_0^* \end{bmatrix} \leftrightarrow \underline{h} = \begin{bmatrix} h_0 \\ h_1 \end{bmatrix} \quad (4)$$

The vector $\underline{h}$ holds the same information as the matrix $\underline{H}$ and is introduced for notational convenience. It allows the orthogonality of the matrix $\underline{H}$ to be written as $$\underline{H}^H\underline{H} = \underline{H}\underline{H}^H = \|\underline{h}\|^2 \underline{I} \quad (5)$$

where $\|\underline{h}\|$ denotes the norm of the vector $\underline{h}$ and $\underline{I}$ is the identity matrix of the appropriate dimension (2×2 in this case).

The result of adding and multiplying Alamouti matrices as well as of taking the inverse of an Alamouti matrix is still an Alamouti matrix. This means that the set of all Alamouti matrices is closed under addition, multiplication and inversion. This can be seen when these operations are written down explicitly. If $\underline{A}$ and $\underline{B}$ are Alamouti matrices, $$\underline{A} + \underline{B} = \begin{bmatrix} a & b \\ -b^* & a^* \end{bmatrix} + \begin{bmatrix} c & d \\ -d^* & c^* \end{bmatrix} = \begin{bmatrix} a+c & b+d \\ -(b+d)^* & (a+c)^* \end{bmatrix} \quad (6)$$

$$\underline{A} \times \underline{B} = \begin{bmatrix} a & b \\ -b^* & a^* \end{bmatrix} \times \begin{bmatrix} c & d \\ -d^* & c^* \end{bmatrix}$$

$$= \begin{bmatrix} ac - bd^* & ad + bc^* \\ -(ad + bc^*)^* & (ac - bd^*)^* \end{bmatrix}$$

$$\underline{A} = \begin{bmatrix} a & b \\ -b^* & c^* \end{bmatrix}^{-1} = \frac{1}{\|a\|^2}\begin{bmatrix} a^* & -b \\ b^* & a \end{bmatrix}.$$

This allows to simplify the detection process.

In one embodiment, the filter unit 112 carries out a general zero forcing interference suppression (ZFIS) algorithm. This is a linear filter algorithm applied to the received data vector $$\underline{r} = \begin{bmatrix} \underline{r}_1 \\ \vdots \\ \underline{r}_{L_g} \end{bmatrix}$$

such that for a STBC transmitter group 103, 104, 105, the interference from the other STBC transmitter groups 103, 104, 105 in the received signal is suppressed.

The linear filter used is given by the matrix $$\underline{G} = \begin{bmatrix} \underline{G}_{11} & \cdots & \underline{G}_{1L_g} \\ \vdots & \ddots & \vdots \\ \underline{G}_{L_g 1} & \cdots & \underline{G}_{L_g L_g} \end{bmatrix} \quad (7)$$

where each sub matrix $\underline{G}_{ij}$ has to be determined based on the transmission characteristics. Filtering the received data vector $\underline{r}$ using the matrix $\underline{G}$ gives the filtered received data vector $$\underline{\tilde{r}} = \begin{bmatrix} \underline{\tilde{r}}_1 \\ \vdots \\ \underline{\tilde{r}}_{L_g} \end{bmatrix}$$

according to $$\underline{\tilde{r}} = \underline{G}\underline{r} = \underline{G}\underline{H}\underline{x} + \underline{G}\underline{n} = \underline{\tilde{H}}\underline{x} + \underline{\tilde{n}} \quad (8)$$

where $\underline{\tilde{n}} = \underline{G}\underline{n}$. The matrix $\underline{G}$ is chosen such that $$\underline{\tilde{H}} = \underline{G}\underline{H} = \begin{bmatrix} \underline{\tilde{H}}_1 & 0 & \cdots & 0 \\ 0 & \underline{\tilde{H}}_2 & \cdots & 0 \\ \vdots & \vdots & \ddots & \vdots \\ 0 & 0 & \cdots & \underline{\tilde{H}}_{L_g} \end{bmatrix} \quad (9)$$

such that in the filtered received data vector $\underline{\tilde{r}}$, there is no interference between the data sent by different STBC transmitter groups 103, 104, 105. It can be seen from (9) that after filtering according to (8) the data transmitted by a STBC transmitter group 103, 104, 105 can be processed independently of the data transmitted by the other STBC transmitter groups 103, 104, 105 since all interference from the other STBC transmitter groups 103, 104, 105 has been removed. The channel model for the $g^{th}$ STBC transmitter group 103, 104, 105 can then be written as $$\underline{\tilde{r}}_g = \underline{\tilde{H}}_g \underline{x}_g + \underline{\tilde{n}}_g \quad (10)$$

where $\Sigma_k \underline{G}_{gk} \underline{H}_{kg} = \underline{\tilde{H}}_g$ and the noise component $\underline{\tilde{n}}_g$ is bi-variate complex Gaussian distributed with zero mean and correlation matrix $$\sigma_n^2 \left( \sum_k \|\underline{g}_{gk}\|^2 \right) \underline{I}.$$

The generality of this formulation results in some flexibility in implementation. The matrix $\underline{G}$ has $L_g \times 2 \times 2$ degrees of freedom which are not all used for fulfilling (9). Therefore, in one embodiment a first constraint (denoted by constraint A) is used and in another embodiment, a second constraint (denoted by constraint B) is used such that the matrix $\underline{G}$ is uniquely defined by equation (9) and the respective constraint. These two embodiments are equivalent in the sense that the same results are given for coded and uncoded systems. The different choice of the constraint for matrix $\underline{G}$ allows different hardware architectures to be used which may be more appropriate for different scenarios.

Constraint A is given by $\underline{G}_{ii} = \underline{I}$ where $i = 1, \ldots, L_g$. When $\underline{G}_{ii} = \underline{I}$, the sub matrices $\underline{G}_{ij}$ with $i \neq j$ ($i = 1, \ldots, L_g$) can be uniquely determined using (9).

Constraint B is given by $\underline{\tilde{H}}_i = \underline{I}$ where $i = 1, \ldots, L_g$. When $\underline{\tilde{H}}_i = \underline{I}$, the sub matrices $\underline{G}_{ij}$ with $i \neq j$ ($i = 1, \ldots, L_g$) can be uniquely determined using (9). In this case, $\underline{G} = \underline{H}^{-1}$.

In an uncoded system, based on (10), for unbiased estimation, the data transmitted by the $g^{th}$ STBC transmitter group 103, 104, 105 is estimated by $$\underline{x}_{g,ZF} = \underline{\tilde{J}}_g^{-1} \underline{\tilde{r}}_g = \underline{x}_g + \underline{\tilde{H}}_g^H \underline{\tilde{n}}_g / \|\underline{\tilde{h}}_g\|^2. \quad (11)$$

A slicer is used to determine the corresponding transmitted symbols based on this estimation. As will be explained below, the estimation $\underline{x}_{g,ZF}$ is also used for computing the metric for soft decoding a forward error control (FEC) code as well.

Instead of using two filter steps in the linear filter 112, namely the filter steps according to (8) and (11), the linear filter 112 may also generate $\underline{x}_{g,ZF}$ in one filter step which is a combination of these two filter steps according to $$\underline{\tilde{x}}_{ZF} = \begin{bmatrix} \underline{\tilde{x}}_1 \\ \underline{\tilde{x}}_2 \\ \vdots \\ \underline{\tilde{x}}_{L_g} \end{bmatrix} = \begin{bmatrix} \tilde{H}_1^{-1} & 0 & \cdots & 0 \\ 0 & \ddots & \ddots & \vdots \\ \vdots & \ddots & \ddots & 0 \\ 0 & \cdots & 0 & \tilde{H}_{L_g}^{-1} \end{bmatrix} \underline{\tilde{r}} = \underline{G}'\underline{r} \quad (12)$$

where $$\underline{G}' = \begin{bmatrix} \tilde{H}_1^{-1}\underline{G}_{11} & \cdots & \tilde{H}_1^{-1}\underline{G}_{1L_g} \\ \vdots & \ddots & \vdots \\ \tilde{H}_{L_g}^{-1}\underline{G}_{L_g 1} & \cdots & \tilde{H}_{L_g}^{-1}\underline{G}_{L_g L_g} \end{bmatrix}. \quad (13)$$

In a FEC-coded system, for example when the bit streams 107, 108, 109 are convolutionally encoded, the data received from each STBC transmitter groups 103, 104, 105 can be processed independently based on (10). Since the noise variance of $\underline{\tilde{n}}_g$ is $$\frac{1}{\sigma_{\tilde{n}}^2 \left(\sum_k \|g_{gk}\|^2\right)},$$

the optimal metric used for soft decoding is given as $$\frac{1}{\sigma_{\tilde{n}}^2 \left(\sum_k \|g_{gk}\|^2\right)} \|\underline{\tilde{r}}_g - \tilde{H}_g \underline{x}_g\|^2 = \frac{\|\tilde{h}_g\|^2}{\sigma_{\tilde{n}}^2 \left(\sum_k \|g_{gk}\|^2\right)} \|\underline{x}_{g,ZF} - \underline{x}_g\|^2. \quad (14)$$

The second form of metric calculation, i.e. the right hand side of (14), is more desirable since $\|\underline{x}_{g,ZF} - \underline{x}_g\|^2$ can be computed easily element by element for a fixed constellation of a transmitted symbol. Therefore, in one embodiment, this form is used for metric calculation.

In this case $\underline{x}_{g,ZF}$ and the channel normalization factor defined as $$\rho_g = \frac{\|\tilde{h}_g\|^2}{\sigma_{\tilde{n}}^2 \left(\sum_k \|g_{gk}\|^2\right)} \quad (15)$$

is explicitly calculated.

The remaining required operations according to (14) can be carried out by standard computation and the results can be passed as soft input to a Viterbi decoder.

The detection according to (11) (denoted by ZFIS Option 1) and (12) (denoted by ZFIS Option 2) are based on constraint A. When the detection is based on constraint B, and G is calculated as the inverse of H (denoted by ZFIS Option 3), a matrix inversion of H is required. In this case, the complexity can be reduced if the matrix H is inverted efficiently.

In the specific case $L_r = L_g = 3$, the channel matrix H is a 6×6 matrix which consists of nine Alamouti matrices. Additions can be carried out much faster than multiplications and, in view of a hardware implementation, less silicon area or chip space is required to implement additions than multiplications. Therefore, when considering complexity only the number of multiplications and divisions is taken into account. It is differentiated between the number of real operations and complex operations. In terms of complexity and necessary hardware, each complex multiplication can be expressed as a multiple of a real multiplication, usually a multiple to 3 or 4.

The ZFIS algorithms introduced above require matrix additions, matrix multiplications and matrix inversions. Since Alamouti matrices are closed under addition and multiplication, when these operations are carried out for two Alamouti matrices, only the first row of the resulting matrix needs to be calculated. The second row can be obtained by sign change and/or conjugate operations. Therefore, for a multiplication of two 2×2 Alamouti matrices, only 4 complex multiplications are required.

From (6), it can be seen that a matrix inversion of a 2×2 Alamouti matrix can be done by scaling and reordering of matrix elements. If $$\underline{a} = \begin{bmatrix} a \\ b \end{bmatrix},$$

the norm of $\underline{a}$ is given by $$\|\underline{a}\|^2 = a_R^2 + a_I^2 + b_R^2 + b_I^2 \quad (16)$$

where the subscript R denotes the real part of the respective complex number and I denotes the imaginary part of the respective complex number. $\|\underline{a}\|^2$ can therefore be computed using 4 real multiplications. Taking the reciprocal of $\|\underline{a}\|^2$ requires 1 real division. For multiplying $$\frac{1}{\|\underline{a}\|^2}$$

with the real parts and imaginary parts of the first row of the matrix $$\begin{bmatrix} a^* & -b \\ b^* & a \end{bmatrix}$$

to get the first row of the inverse matrix (the second row can be, as mentioned above, be calculated without further multiplications) 4 real multiplications are additionally needed. For a multiplication of a matrix A with the identity matrix, no operations are required since AI=IA=A.

The channel matrix H is estimated in a channel training phase. Subsequently, the receiver 101 receives the data vector r which is filtered to reconstruct the sent data vector x.

In one embodiment, the detection method is divided into two stages, a pre-computation stage (before the r has been received or is processed) and a filtering stage (when the vector r is processed).

In the pre-computation stage, $\rho_g$ is calculated according to (15) and all computations are carried out that allow the calculation of $\underline{x}_{g,ZF}$ according to (11) or (12) respectively as soon as the vector r is available. Specifically, in the pre-computation stage, (after the channel has been estimated and the matrix H has been generated), the following steps are carried out:

(a) The matrix $\underline{G}$ and $$\sum_k \|\underline{g}_{gk}\|^2$$

are calculated
(b) The matrices $\underline{\tilde{H}}_g$ and $\underline{\tilde{H}}_g^{-1}$ and $\|\underline{\tilde{h}}_g\|^2$ are calculated
(c) The matrix $\underline{G'}$ is calculated (this requires $\underline{G}$ and $\underline{\tilde{H}}_g^{-1}$ and is only done when ZFIS Option 2 is used)
(d) $\rho_g$ is calculated according to (15)

ZFIS Option 1 requires less pre-computation than ZFIS Option 1 but uses a two-step filter instead of a one-step filter.

In the filtering stage in case of ZFIS Option 1, the following step is carried out
(a1) $\underline{\tilde{r}}=\underline{G}\underline{r}$ and $\underline{x}_{g,ZF}=\underline{\tilde{H}}_g^{-1}\underline{\tilde{r}}_g$ are calculated.

In the filtering stage in case of ZFIS Option 2, the following step is carried out
(a2) $\underline{x}_{ZF}=\underline{G'}\underline{r}$ is calculated.

In the example with $L_r=L_g=3$, the ZFIS filter matrix $\underline{G}$ has the form $$\underline{G} = \begin{bmatrix} \underline{G}_{11} & \underline{G}_{12} & \underline{G}_{13} \\ \underline{G}_{21} & \underline{G}_{22} & \underline{G}_{23} \\ \underline{G}_{31} & \underline{G}_{32} & \underline{G}_{33} \end{bmatrix}. \quad (17)$$

where $\underline{G}_{gg}=\underline{I}$ (g=1, 2, 3) and the other 2×2 square sub matrices are calculated according to (9) by $$\underline{G}_{12} = [\underline{H}_{13}\underline{H}_{33}^{-1} - \underline{H}_{12}\underline{H}_{32}^{-1}][\underline{H}_{22}\underline{H}_{32}^{-1} - \underline{H}_{23}\underline{H}_{33}^{-1}]^{-1} \quad (18)$$

$$\underline{G}_{13} = [\underline{H}_{13}\underline{H}_{23}^{-1} - \underline{H}_{12}\underline{H}_{22}^{-1}][\underline{H}_{32}\underline{H}_{22}^{-1} - \underline{H}_{33}\underline{H}_{23}^{-1}]^{-1}$$

$$\underline{G}_{21} = [\underline{H}_{23}\underline{H}_{33}^{-1} - \underline{H}_{21}\underline{H}_{31}^{-1}][\underline{H}_{11}\underline{H}_{31}^{-1} - \underline{H}_{13}\underline{H}_{33}^{-1}]^{-1}$$

$$\underline{G}_{23} = [\underline{H}_{23}\underline{H}_{13}^{-1} - \underline{H}_{21}\underline{H}_{11}^{-1}][\underline{H}_{31}\underline{H}_{11}^{-1} - \underline{H}_{33}\underline{H}_{13}^{-1}]^{-1}$$

$$\underline{G}_{31} = [\underline{H}_{32}\underline{H}_{22}^{-1} - \underline{H}_{31}\underline{H}_{21}^{-1}][\underline{H}_{11}\underline{H}_{21}^{-1} - \underline{H}_{12}\underline{H}_{22}^{-1}]^{-1}$$

$$\underline{G}_{32} = [\underline{H}_{32}\underline{H}_{12}^{-1} - \underline{H}_{31}\underline{H}_{11}^{-1}][\underline{H}_{21}\underline{H}_{11}^{-1} - \underline{H}_{22}\underline{H}_{12}^{-1}]^{-1}$$

The terms for $\underline{G}_{ij}$ (i≠j according to (18)) consist of two factors (enclosed in square factors). They are denoted by left side factor and right side factor according to the order in which they are written in (18). Since $\underline{G}_{gg}=\underline{I}$ (g=1, 2, 3) the matrices $\underline{G}_{gg}$ do not need to be calculated.

The right side factors of all $\underline{G}_{ij}$ can be calculated first using the matrices given in the second column of table 1. The left side factors can be calculated subsequently using the matrices in the second column and the third column.

TABLE 1

| Group (value of index i) | Computation for right and left side factor | Computation for left side factor |
|---|---|---|
| 1 | $\underline{H}_{23}\underline{H}_{33}^H, \underline{H}_{32}\underline{H}_{22}^H$ | $\underline{H}_{13}\underline{H}_{23}^H$ |
| 2 | $\underline{H}_{13}\underline{H}_{33}^H, \underline{H}_{31}\underline{H}_{11}^H$ | $\underline{H}_{21}\underline{H}_{31}^H$ |
| 3 | $\underline{H}_{12}\underline{H}_{22}^H, \underline{H}_{21}\underline{H}_{11}^H$ | $\underline{H}_{32}\underline{H}_{12}^H$ |

The required complexity (for 9 $\underline{H}_i\underline{H}_j^H$ terms) is:
9×4=36 complex multiplications for $\underline{H}_i\underline{H}_j^H$
9×4=36 real multiplications for $\|\underline{h}_j\|^2$ For example, the sub matrix $\underline{G}_{12}$ is calculated according to $$\underline{G}_{12} = [\underline{H}_{13}\underline{H}_{33}^{-1} - \underline{H}_{12}\underline{H}_{32}^{-1}][\underline{H}_{22}\underline{H}_{32}^{-1} - \underline{H}_{23}\underline{H}_{33}^{-1}]^{-1} \quad (19)$$

$$= \left[\frac{1}{\|\underline{h}_{33}\|^2}\underline{H}_{13}\underline{H}_{33}^H - \frac{1}{\|\underline{h}_{32}\|^2}\underline{H}_{12}\underline{H}_{32}^H\right] \times \underline{C}^H \times$$

$$\frac{\|\underline{h}_{33}\|^2\|\underline{h}_{32}\|^2}{\|\underline{c}\|^2}$$

$$= [\|\underline{h}_{32}\|^2\underline{H}_{13}\underline{H}_{33}^H - \|\underline{h}_{33}\|^2\underline{H}_{12}\underline{H}_{32}^H] \times \underline{C}^H \times \frac{1}{\|\underline{c}\|^2}$$

where $$\underline{C} = \|\underline{h}_{33}\|_2\underline{H}_{22}\underline{H}_{32}^H - \|\underline{h}_{32}\|^2\underline{H}_{23}\underline{H}_{33} \quad (20)$$

The required (for 6 Gij terms where i≠j) complexity is:
6×4×4=96 real multiplications for the real scalar-multiplications written in square brackets in (19)
6×4=24 real multiplications for $\|\underline{c}\|^2$
6×1 real divisions for reciprocal of $\|\underline{c}\|^2$
6×4=24 complex multiplications for the matrix multiplications
6×4=24 real multiplications for real scalar-matrix normalization For the calculation of $$\sum_k \|\underline{g}_{gk}\|^2$$

in step (a) in the case $L_r=L_g=3$, i.e. for the calculation of 6 $\|\underline{g}_{gk}\|^2$ terms with g≠k (since $\|\underline{g}_{gg}\|^2=1$) 6×4=24 real multiplications are required.

These terms are combined according to $$\sum_k \|\underline{g}_{1k}\|^2 = 1 + \|\underline{g}_{12}\|^2 + \|\underline{g}_{13}\|^2 \quad (21)$$

$$\sum_k \|\underline{g}_{2k}\|^2 = \|\underline{g}_{21}\|^2 + 1 + \|\underline{g}_{23}\|^2$$

$$\sum_k \|\underline{g}_{3k}\|^2 = \|\underline{g}_{31}\|^2 + \|\underline{g}_{32}\|^2 + 1$$

In stage (b), $$\underline{\tilde{H}}_g = \sum_k \underline{G}_{gk}\underline{H}_{kg} \quad (22)$$

is calculated. For example, when $L_r=L_g=3$ $$\underline{\tilde{H}}_1 = \underline{H}_{11} + \underline{G}_{12}\underline{H}_{21} + \underline{G}_{13}\underline{H}_{31}$$

$$\underline{\tilde{H}}_2 = \underline{G}_{21}\underline{H}_{12} + \underline{H}_{22} + \underline{G}_{23}\underline{H}_{32}$$

$$\underline{\tilde{H}}_3 = \underline{G}_{31}\underline{H}_{13} + \underline{G}_{32}\underline{H}_{23} + \underline{H}_{33} \quad (23)$$

This requires 3×2×4=24 complex multiplications (for the three $\underline{\tilde{H}}_g$ terms.

Further, in step (b), the matrix $\underline{\tilde{H}}_g^{-1}$ and the value $\|\underline{\tilde{h}}_g\|^2$ need to be calculated. For $L_r=L_g=3$, this requires
3×4=12 real multiplications for 3 $\|\underline{\tilde{h}}_g\|^2$ terms
3×1=3 real divisions for the reciprocals of $\|\underline{\tilde{h}}_g\|^2$
3×4=12 real multiplications for 3 scalar-matrix multiplications.

In step (c), $\underline{G}'$ is calculated, in case $L_r=L_g=3$ this is $$\underline{G}' = \begin{bmatrix} \tilde{\underline{H}}_1^{-1} & 0 & 0 \\ 0 & \tilde{\underline{H}}_2^{-1} & 0 \\ 0 & 0 & \tilde{\underline{H}}_3^{-1} \end{bmatrix} \begin{bmatrix} \underline{I} & \underline{G}_{12} & \underline{G}_{13} \\ \underline{G}_{21} & \underline{I} & \underline{G}_{23} \\ \underline{G}_{31} & \underline{G}_{32} & \underline{I} \end{bmatrix} \quad (24)$$

$$= \begin{bmatrix} \tilde{\underline{H}}_1^{-1} & \tilde{\underline{H}}_1^{-1}\underline{G}_{12} & \tilde{\underline{H}}_1^{-1}\underline{G}_{13} \\ \tilde{\underline{H}}_2^{-1}\underline{G}_{21} & \tilde{\underline{H}}_2^{-1} & \tilde{\underline{H}}_2^{-1}\underline{G}_{23} \\ \tilde{\underline{H}}_3^{-1}\underline{G}_{31} & \tilde{\underline{H}}_3^{-1}\underline{G}_{32} & \tilde{\underline{H}}_3^{-1} \end{bmatrix}$$

This requires 6×4=24 complex multiplications.

As mentioned above, this is not done in ZFIS Option 1.

In step (d) (15) is calculated. This requires 3 real multiplications if $L_r=L_g=3$.

In the filtering step according to ZFIS Option 1, 3×8+18=42 complex multiplications are required for $\tilde{r}=\underline{Gr}$ and $\underline{x}_{g,ZF}=\tilde{\underline{H}}_g^{-1}\tilde{r}_g$ if $L_r=L_g=3$. Since $\underline{G}_{gg}=\underline{I}$, $\tilde{r}=\underline{Gr}$ may be simplified.

In the filtering step according to ZFIS Option 2, 6×6=36 complex multiplications are required for $\underline{x}_{ZF}=\underline{G}'\underline{r}$ if $L_r=L_g=3$.

The complexity of ZFIS Options 1 and 2 are summarized in tables 2 and 3 for $L_r=L_g=3$.

TABLE 2

| term | multiplications | | divisions |
|---|---|---|---|
| $\|\underline{h}_j\|^2$, $\underline{H}_i\underline{H}_j^H$ | 36 complex, | 36 real | — |
| $\underline{G}_{ij}$ (i ≠ j) | 24 complex, | 144 real | 6 |
| $\|\underline{g}_{gk}\|^2$ | | 24 real | — |
| $\tilde{\underline{H}}_g = \sum_k \underline{G}_{gk}\underline{H}_{kg}$ | 24 complex | | — |
| $\tilde{\underline{H}}_g^{-1}$, $\|\tilde{\underline{h}}_g\|^2$ | | 24 real | 3 |
| $\underline{G}'$ | 24 complex | | — |
| $\dfrac{\|\tilde{\underline{h}}_g\|^2}{\sum_k \|\underline{g}_{gk}\|^2}$ | — | | 3 |
| $\underline{x}_{ZF} = \underline{G}'\underline{r}$ | 36 complex | | — |
| total | 144 complex, | 228 real | 23 |

TABLE 3

| term | multiplications | | divisions |
|---|---|---|---|
| $\|\underline{h}_j\|^2$, $\underline{H}_i\underline{H}_j^H$ | 36 complex, | 36 real | — |
| $\underline{G}_{ij}$ (i ≠ j) | 24 complex, | 144 real | 6 |
| $\|\underline{g}_{gk}\|^2$ | | 24 real | — |
| $\tilde{\underline{H}}_g = \sum_k \underline{G}_{gk}\underline{H}_{kg}$ | 24 complex | | — |
| $\tilde{\underline{H}}_g^{-1}$, $\|\tilde{\underline{h}}_g\|^2$ | | 24 real | 3 |
| $\dfrac{\|\tilde{\underline{h}}_g\|^2}{\sum_k \|\underline{g}_{gk}\|^2}$ | — | | 3 |
| $\tilde{r} = \underline{Gr}$ | 24 complex | | — |
| $\underline{x}_{ZF,g} = \tilde{\underline{H}}_g^{-1}\tilde{r}$ | 18 complex | | — |
| total | 126 complex, | 228 real | 12 |

In one embodiment where ZFIS Option 3 is used, the inversion of the matrix H is carried out according to a fast matrix multiplication approach discovered by Strassen in 1969 (see [1]) which uses a divide and conquer approach.

For inverting a matrix $\underline{H}$ having the structure $$\underline{H} = \begin{bmatrix} a_{11} & a_{12} \\ a_{21} & a_{22} \end{bmatrix} = \begin{bmatrix} c_{11} & c_{12} \\ c_{21} & c_{22} \end{bmatrix}^{-1} \quad (25)$$

where $a_{ij}$ and $c_{ij}$ can be scalars or sub matrices of appropriate dimensions, the following computations are carried out:

$R_1 = (a_{11})^{-1}$ $R_2 = a_{21} \times R_1$ $R_3 = R_1 \times a_{12}$ $R_4 = a_{21} \times R_3$ $R_5 = R_4 - a_{22}$ $R_6 = (R_5)^{-1}$ $c_{12} = R_3 \times R_6$ $c_{21} = R_6 \times R_2$ $R_7 = R_3 \times c_{21}$ $c_{11} = R_1 - R_7$ $c_{22} = -R_6$ \quad (26)

This can be done for a matrix of any dimension having the structure according to (25). However, the above operations have to be carried out serially.

For example, in the case $L_r=L_g=3$, the channel matrix H is a 6×6 matrix consisting of 9 sub matrices $\underline{H}_{ij}$ (i, j=1, $\overline{2, 3}$) which may be divided such that into the structure (25) according to $$\underline{H} = \begin{bmatrix} \underline{H}_{11} & \underline{H}_{12} & \underline{H}_{13} \\ \underline{H}_{21} & \underline{H}_{22} & \underline{H}_{23} \\ \underline{H}_{31} & \underline{H}_{32} & \underline{H}_{33} \end{bmatrix} = \begin{bmatrix} [\underline{H}_{11}] & [\underline{H}_{12} & \underline{H}_{13}] \\ \begin{bmatrix} \underline{H}_{21} \\ \underline{H}_{31} \end{bmatrix} & \begin{bmatrix} \underline{H}_{22} & \underline{H}_{23} \\ \underline{H}_{32} & \underline{H}_{33} \end{bmatrix} \end{bmatrix} \quad (27)$$

For higher numbers of $L_r$ and $L_g$, H can be partitioned in such a way that the lower-right submatrix of H, $a_{22}$, in this example $$\begin{bmatrix} \underline{H}_{22} & \underline{H}_{23} \\ \underline{H}_{32} & \underline{H}_{33} \end{bmatrix},$$

has the largest possible dimension (being a power of 2) such that the STBC matrix $\underline{H}_{11}$ is not partitioned.

If needed for higher numbers of $L_r$ and $L_g$, the partitioning can be done recursively such that there is one sub-matrix (e.g. $a_{22}$) with the largest possible dimension (being a power of 2) making sure that the STBC matrix $\underline{H}_{11}$ is not partitioned. This sub-matrix can then be partitioned itself and inverted according to the inverting scheme above.

In the example $L_r=L_g=3$, another partitioning is possible, for example by forming a 2×2 sub matrix in the upper left of H. It can be seen that when equations (26) are applied to this partitioning of H, the matrices generated by the equations and multiplied according to the equations (26) have the correct dimensions such that no impossible multiplication has to be carried out in terms of matrix dimensions (a 4×4 matrix with a 2×2 matrix for example.) The inversion of the lower right 4×4 matrix $$\underline{c}_{22} = \begin{bmatrix} H_{22} & H_{23} \\ H_{32} & H_{33} \end{bmatrix}$$

may also be done according to the equations (26). Since the $H_{ij}$ (i, j=1, 2, 3) have Alamouti structure (and these are closed under multiplication, addition and inversion), only the first rows of the matrices need to be computed. Further, simplifications for calculation of inverse matrices of 2×2 matrices and calculation of determinants of 2×2 matrices can be used.

With $G=H^{-1}$, the filtered channel matrix $\tilde{H}$ is an identity matrix. In this case, $\|\underline{\tilde{h}}_g\|_2$ needs not to be computed.

The complexity of ZFIS Option 3 is summarized in table 4 for $L_r=L_g=3$. It involves all the necessary computations to generating the estimate $\underline{x}_{ZF,g}$ (g=1, 2, 3) and the channel normalization factor according to (14) for the decoder (for example Viterbi decoder).

TABLE 4

| term | multiplications | | divisions |
|---|---|---|---|
| $\underline{H}^{-1}$ | 96 complex, | 24 real | 3 |
| $\|\underline{g}_{gk}\|^2$ | | 36 real | — |
| $\|\underline{\tilde{h}}_g\|^2$ | | 0 real | — |
| $\dfrac{\|\underline{\tilde{h}}_g\|^2}{\sum_k \|\underline{g}_{gk}\|^2}$ | — | | 3 |
| $\underline{x}_{ZF,g} = \underline{\tilde{H}}_g^{-1} \underline{\tilde{r}}_g$ | 36 complex | | — |
| total | 132 complex, | 60 real | 6 |

The ZFIS algorithm is a generalization of the zero-forcing (ZF) detector. A minimum mean squared error (MMSE) detector can also be used by the filter unit 112. In this case, the filter matrix is given by $$\underline{G}_{MMSE} = [H^H H + \sigma_n^2 I]^{-1} H^H \quad (28)$$

As in the case $G=H^{-1}$, the inverse of a matrix needs to be calculated. Since $$[H^H H + \sigma_n^2 I]$$

also consists of Alamouti sub matrices, the method explained above for low-complexity matrix inversion can be used as well.

In the following, an example is given for the inversion of a 6×6 matrix comprising 2×2 matrices with Alamouti structure. The matrix to be inverted is given by $$\begin{bmatrix} a_{11} & b_{11} & a_{12} & b_{12} & a_{13} & b_{13} \\ -b_{11}^* & a_{11}^* & -b_{12}^* & a_{12}^* & -b_{13}^* & a_{13}^* \\ a_{21} & b_{21} & a_{22} & b_{22} & a_{23} & b_{23} \\ -b_{21}^* & a_{21}^* & -b_{22}^* & a_{22}^* & -b_{23}^* & a_{23}^* \\ a_{31} & b_{31} & a_{32} & b_{32} & a_{33} & b_{33} \\ -b_{31}^* & a_{31}^* & -b_{32}^* & a_{32}^* & -b_{33}^* & a_{33}^* \end{bmatrix} = \begin{bmatrix} \underline{m}_{11} & \underline{m}_{12} & \underline{m}_{13} \\ \underline{m}_{21} & \underline{m}_{22} & \underline{m}_{23} \\ \underline{m}_{31} & \underline{m}_{32} & \underline{m}_{33} \end{bmatrix} \quad (29)$$

The objective is to compute $$\underline{G} = \begin{bmatrix} \underline{g}_{11} & \underline{g}_{12} & \underline{g}_{13} \\ \underline{g}_{21} & \underline{g}_{22} & \underline{g}_{23} \\ \underline{g}_{31} & \underline{g}_{32} & \underline{g}_{33} \end{bmatrix} = \begin{bmatrix} \underline{m}_{11} & \underline{m}_{12} & \underline{m}_{13} \\ \underline{m}_{21} & \underline{m}_{22} & \underline{m}_{23} \\ \underline{m}_{31} & \underline{m}_{32} & \underline{m}_{33} \end{bmatrix}^{-1} \quad (30)$$

Given two matrices $$\underline{S}_1 = \frac{1}{k_1} \begin{bmatrix} a_1 & b_1 \\ -b_1^* & a_1^* \end{bmatrix} \text{ and}$$

$$\underline{S}_2 = \frac{1}{k_2} \begin{bmatrix} a_2 & b_2 \\ -b_2^* & a_2^* \end{bmatrix}$$

represented as $\underline{S}_1=\{a_1, b_1, k_1\}$ and $\underline{S}_2=\{a_2, b_2, k_2\}$, the following rules are used:

$\underline{S}_1 + \underline{S}_2 = \{k_2 a_1 + k_1 a_2, k_2 b_1 + k_1 b_2, k_1 k_2\}$ $\underline{S}_1 - \underline{S}_2 = \{k_2 a_1 - k_1 a_2, k_2 b_1 - k_1 b_2, k_1 k_2\}$ $\underline{S}_1 \otimes \underline{S}_2 = \{a_1 a_2 - b_1 b_2^*, a_1 b_2 + b_1 a_2^*, k_1 k_2\}$ $\underline{S}_1^{-1} = \{k_1 a_1^*, -k_1 b_1, |a_1|^2 + |b_1|^2\}$ $-\underline{S}_1 = \{-a_1, -b_1, k_1\} \quad (31)$ The solution to the 6×6 matrix inversion is obtained by first performing matrix inversion on the 4×4 matrix $$\begin{bmatrix} \underline{m}_{11} & \underline{m}_{12} \\ \underline{m}_{21} & \underline{m}_{22} \end{bmatrix}^{-1} = \begin{bmatrix} \underline{c}_{11} & \underline{c}_{12} \\ \underline{c}_{21} & \underline{c}_{22} \end{bmatrix} \quad (32)$$

corresponding to (26) according to the equations:

$\underline{R} = \underline{m}_{11}^{-1}$ $\underline{R}_2 = \underline{m}_{21} \otimes \underline{R}_1$ $\underline{R}_3 = \underline{R}_1 \otimes \underline{m}_{12}$ $\underline{R}_4 = \underline{m}_{21} \otimes \underline{R}_3$ $\underline{R}_5 = \underline{R}_4 - \underline{m}_{22}$ $\underline{R}_6 = \underline{R}_5^{-1}$ $\underline{c}_{12} = \underline{R}_3 \otimes \underline{R}_6$ $\underline{c}_{21} = \underline{R}_6 \otimes \underline{R}_2$ $\underline{R}_7 = \underline{R}_3 \otimes \underline{c}_{21}$ $\underline{c}_{11} = \underline{R}_1 - \underline{R}_7$ $\underline{c}_{22} = -\underline{R}_6 \quad (33)$ Equations (26) are then iteratively used a second time such that the final solution is calculated according to $$Q_{2,11a} = \underline{m}_{31} \otimes \underline{c}_{11}$$

$$Q_{2,11b} = \underline{m}_{32} \otimes \underline{c}_{21}$$

$$Q_{2,11} = Q_{2,11a} + Q_{2,11b}$$

$$Q_{2,12a} = \underline{m}_{31} \otimes \underline{c}_{12}$$

$$Q_{2,12b} = \underline{m}_{32} \otimes \underline{c}_{22}$$

$$Q_{2,12} = Q_{2,12a} + Q_{2,12b}$$

$$Q_{3,11a} = \underline{c}_{11} \otimes \underline{m}_{13}$$

$$Q_{3,11b} = \underline{c}_{12} \otimes \underline{m}_{23}$$

$$Q_{3,11} = Q_{3,11a} + Q_{3,11b}$$

$$Q_{3,21a} = \underline{c}_{21} \otimes \underline{m}_{13}$$

$$Q_{3,21b} = \underline{c}_{22} \otimes \underline{m}_{23}$$

$$Q_{3,21} = Q_{3,21a} + Q_{3,21b}$$

$$Q_{4a} = \underline{m}_{31} \otimes Q_{3,11}$$

$$Q_{4b} = \underline{m}_{32} \otimes Q_{3,21}$$

$$Q_4 = Q_{4a} + Q_{4b}$$

$$Q_5 = Q_4 - \underline{m}_{33}$$

$$Q_6 = Q_5^{-1}$$

$$\underline{g}_{13} = Q_{3,11} \otimes Q_6$$

$$\underline{g}_{23} = Q_{3,21} \otimes Q_6$$

$$\underline{g}_{31} = Q_6 \otimes Q_{2,11}$$

$$\underline{g}_{32} = Q_6 \otimes Q_{2,12}$$

$$Q_{7,11} = Q_{3,11} \otimes \underline{g}_{31}$$

$$Q_{7,12} = Q_{3,11} \otimes \underline{g}_{32}$$

$$Q_{7,21} = Q_{3,21} \otimes \underline{g}_{31}$$

$$Q_{7,22} = Q_{3,21} \otimes \underline{g}_{32}$$

$$\underline{g}_{11} = \underline{c}_{11} - Q_{7,11}$$

$$\underline{g}_{12} = \underline{c}_{12} - Q_{7,12}$$

$$\underline{g}_{21} = \underline{c}_{21} - Q_{7,21}$$

$$\underline{g}_{22} = \underline{c}_{22} - Q_{7,22}$$

$$\underline{g}_{33} = -Q_6 \tag{34}$$

Divisions are only required when the matrices are recovered to their final form from the notation $\{a_1, b_1, k_1\}$ to $$\frac{1}{k_1} \begin{bmatrix} a_1 & b_1 \\ -b_1^* & a_1^* \end{bmatrix}.$$

All operations above are operations on 2×2 matrices.

The reciprocal computation can be done using the Newton Raphson method. This is based on the method to obtain a zero of a function f (the value of x for which f(x)=0). A guess for a zero x[j], i.e. an approximation of a zero of the function, is iteratively enhanced by $$x[j+1] = x[j] - f(x[j])/f'(x[j]) \tag{35}$$

where f'(x[j]) is evaluated at x[j].

This can be applied to the function f(R)=1/R−k which has a zero at 1/k for computing the inverse of the value k. The iterative formula is in this case given by $$R[j+1] = R[j](2 - R[j]k) \tag{36}$$

where R[0] is an initial guess, i.e. the initial approximation. The iterative formula can be re-written as $$R[j+1] = R[j] + R[j] - (R[j]k)R[j] \tag{37}$$

for computation using a RISC-like architecture. Quadratic convergence can be achieved, the better the initial guess, the faster the convergence. Multiple initial guesses can be used for different ranges of the value of k.

Since only one division at the end of the procedure is necessary, hardware implementation is facilitated. This also enlarges the range of the values that appear in course of the procedure. Numeric simulations show that bit widths of some intermediate result may exceed more than 20 bits. Therefore, in one embodiment, intermediate data is dynamically scaled.

In the following, a possible hardware architecture for carrying out the inversion process described above is described with reference to FIG. 2.

Figure 2:
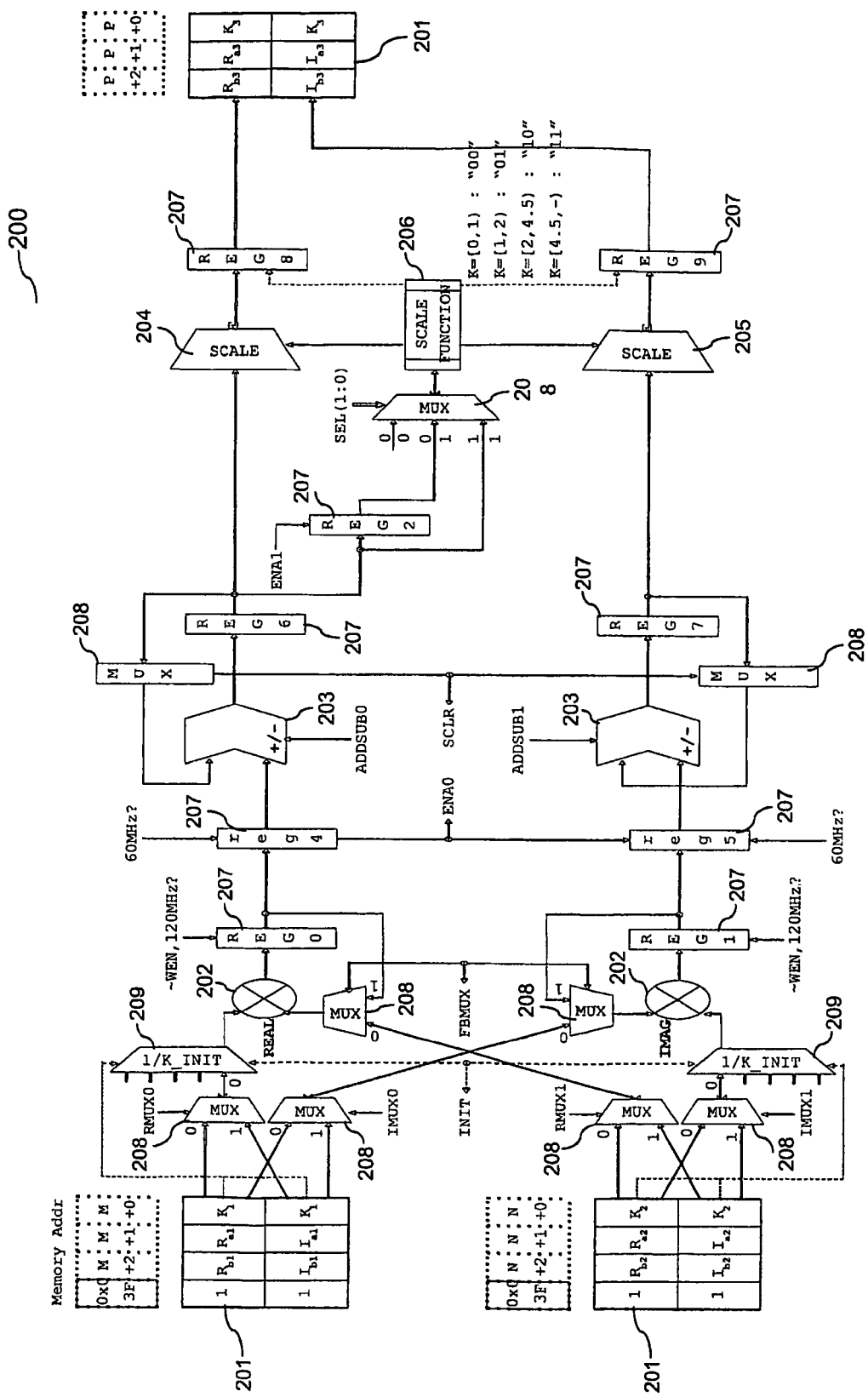
FIG. 2 shows a processor element according to an embodiment of the invention.

FIG. 2 shows a processor element 200 according to an embodiment of the invention.

The processor element 200 comprises a dual-port memory 201 for storing the input and output, two hardware multipliers 202 for multiplying two words, two adding/subtracting units 203 for adding/subtracting, a dynamic scale unit comprising a first scale unit 204, a second scale unit 205 and a scale function unit 206, pipeline registers to store intermediate results, a plurality of multiplexers 208 to direct the data flow and initial guess selection units 209.

Since the memory 201 is a dual-port memory, data stored at the same address can be simultaneously accessed at two output ports. Therefore, operations on the same two complex numbers (multiplication, addition, subtraction) are possible as well as operations on one complex number (squaring, determination of absolute value). The memory is for example operated at 80 MHz, wherein the read cycles and write cycles are alternated (and thus are each clocked at 40 MHz).

The multiplexers denoted by RMUX0, IMUX0, RMUX1, IMUX1 in FIG. 2 route the real parts and imaginary parts of complex numbers stored in the memory 201 to the multipliers 202. They can be controlled such that each combination (i.e. real part of first complex number x real part of second complex number, real part of first complex number x imaginary part of second complex number, imaginary part of first complex number x imaginary part of second complex number, imaginary part of first complex number x real part of second complex number) can be multiplied using the multipliers 201. Therefore, when two complex numbers need to be multiplied, only the two multipliers 201 and two clock cycles are necessary to perform the required four multiplications.

The inversion method based on the Newton Raphson method as explained above is used for reciprocal calculation. When the first iteration is to be initiated, the signal denoted by INIT in FIG. 2 is set to 1. In the subsequent iterations the signal INIT is set to 0 since the result of the previous iteration is used as guess for the next iteration.

Since there are two independent multipliers 201, the reciprocal of two numbers can simultaneously calculated using the iterative Newton Raphson method. This allows an efficient use of hardware resources.

The processing element 200 is for example used for each sub carrier of an OFDM system, for example, in case of 48 sub carriers as it is commonly used, 48 processing elements 200 are used in parallel. The processing element has a RISC-like architecture and is optimized for the 5 basic matrix operations and reciprocal calculation. It can be implemented with high speed (e.g. in ASIC) for a low latency or for allowing processing of more than one sub carrier by the same processing element 200. The scaling decreases the risk of numerical underflow or overflow during the processing.

In the following, a processing flow for detection according to one embodiment of the invention is described.

Figure 3:
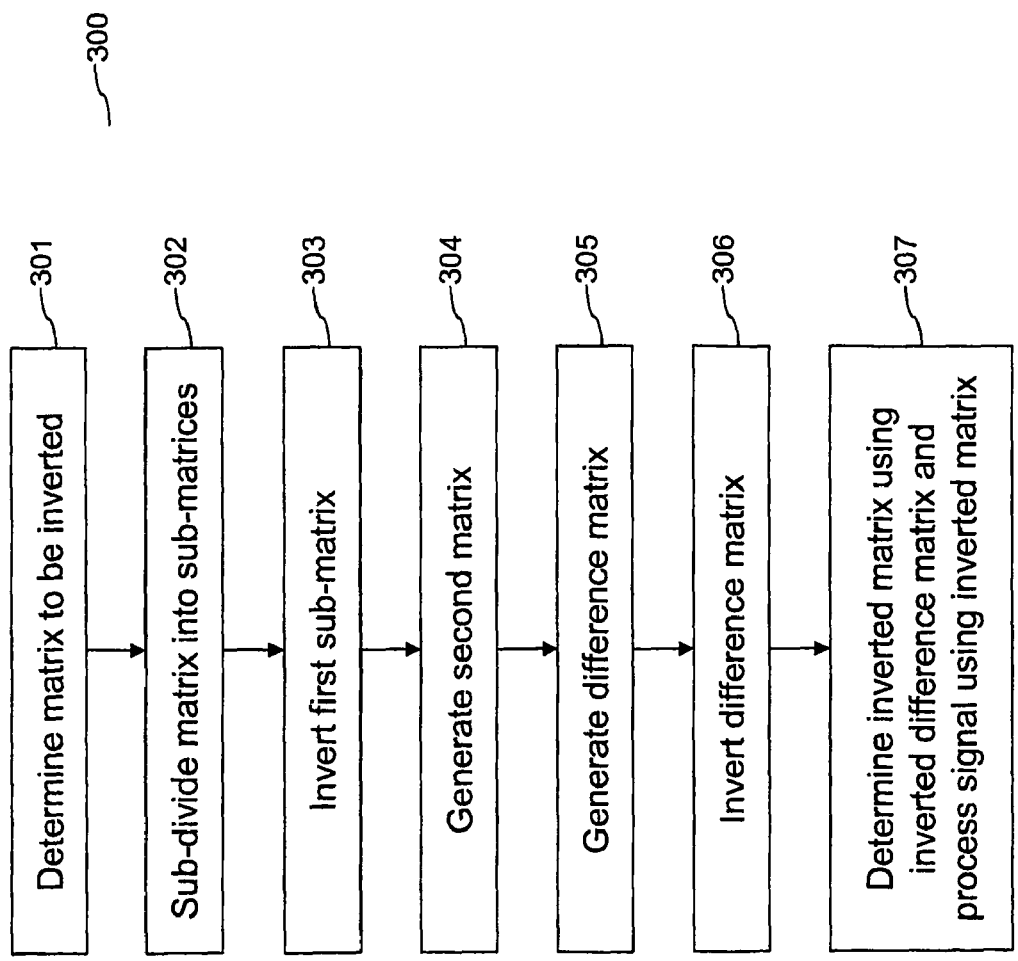
FIG. 3 shows a flow diagram according to an embodiment of the invention.

FIG. 3 shows a flow diagram 300 according to an embodiment of the invention.

In step 301, a first matrix comprising components describing characteristics of the communication channel is determined. This may be the channel matrix H itself or another matrix, for example the matrix $$[H^H H + \sigma_n^2 I]^{-1}$$

for use in an MMSE filter.

The first matrix is inverted by the following steps. In step 302, the first matrix is sub-divided into at least four sub matrices. For example, the matrix is written according to equation (25).

In step 303, a first sub matrix of the four sub matrices is inverted. In the example using the formulas (26), the first sub matrix would be $a_{11}$ which is inverted to get R1.

In step 304, a second matrix (R4 in the example using (26)) is generated by multiplying a second sub matrix ($a_{12}$ in the example using of (26)) of the four sub matrices with the inverted first matrix and a third sub matrix of the four sub matrices ($a_{12}$ in the example using (26)).

In step 305, the difference matrix (R5 in the example using (26)) between the second matrix and a fourth sub matrix ($a_{22}$ in the example using (26)) of the four sub matrices is determined.

In step 306, the difference matrix is inverted (the result would be R6 in the example using (26)).

In step 307, the inverted matrix is calculated based on the inverted difference matrix and the data signal is processed using the inverted first matrix. The inverted first matrix is for example used as a part of a filter matrix or a filter matrix is generated from the inverted first matrix for filtering the received data signal.

In this document, the following publication is cited:
V. Strassen, "Gaussian Elimination is not Optimal," *Numerische Mathematik*, vol 13, pp. 354-356, 1969

The invention claimed is:

1. Method for processing a data signal received via a communication channel, comprising:
   determining a first matrix comprising components describing characteristics of the communication channel;
   inverting the first matrix by:
   sub-dividing the first matrix into at least four sub matrices,
   inverting a first sub matrix of the four sub matrices,
   generating a second matrix by multiplying a second sub matrix of the four sub matrices with the inverted first matrix and a third sub matrix of the four sub matrices,
   determining the difference matrix between the second matrix and a fourth sub matrix of the four sub matrices,
   inverting the difference matrix,
   calculating the inverted matrix based on the inverted difference matrix;
   and
   processing the data signal using the inverted first matrix.

2. Method according to claim 1, wherein the first matrix is inverted according to Strassen's method for matrix inversion.

3. Method according to claim 1, wherein the communication channel is a radio communication channel.

4. Method according to claim 1, wherein the received data signal is processed for estimating a sent data signal that was received as the received data signal.

5. Method according to claim 4, wherein the sent data signal is transmitted using a plurality of transmit antennas.

6. Method according to claim 5, wherein the sent data signal is transmitted according to Groupwise Space Time Block Coding.

7. Method according to claim 4, wherein the sent data signal is transmitted using OFDM modulation.

8. Method according to claim 1, wherein at least one of the four sub matrices has Alamouti structure.

9. Method according to claim 8, wherein the first matrix consists of sub matrices having Alamouti structure.

10. Method according to claim 1, wherein the inverted matrix is used for performing a filter operation on the received data signal.

11. Method according to claim 10, wherein the received data signal is linearly filtered using the inverted matrix.

12. Method according to claim 11, wherein the received data signal is filtered according to a zero forcing interference suppression method, a linear mean squared error detection method or an interference cancellation method.

13. Method according to claim 1, wherein the first matrix is generated from a channel matrix modelling the transmission characteristics of the communication channel.

14. Method according to claim 13, wherein the first matrix is a sub matrix of the channel matrix.

15. Method according to claim 13, wherein the first matrix is the channel matrix.

16. Method according to claim 13, wherein the first matrix is a product of matrices, one factor being the channel matrix or the hermitian of the channel matrix.

17. Data processing unit for processing a data signal received via a communication channel,
   comprising a determining unit configured to determine a first matrix comprising components describing characteristics of the communication channel;
   comprising an inverting unit configured to invert the first matrix by:
   sub-dividing the first matrix into at least four sub matrices,
   inverting a first sub matrix of the four sub matrices,
   generating a second matrix by multiplying a second sub matrix of the four sub matrices with the inverted first matrix and a third sub matrix of the four sub matrices,
   determining the difference matrix between the second matrix and a fourth sub matrix of the four sub matrices,
   inverting the difference matrix,
   calculating the inverted matrix based on the inverted difference matrix;
   wherein the data processing unit is configured to process the data signal using the inverted first matrix.

18. A computer program product, which, when executed by a computer, makes the computer perform a method for processing a data signal received via a communication channel, comprising:

determining a first matrix comprising components describing characteristics of the communication channel;

inverting the first matrix by:

sub-dividing the first matrix into at least four sub matrices, inverting a first sub matrix of the four sub matrices, generating a second matrix by multiplying a second sub matrix of the four sub matrices with the inverted first matrix and a third sub matrix of the four sub matrices, determining the difference matrix between the second matrix and a fourth sub matrix of the four sub matrices, inverting the difference matrix, calculating the inverted matrix based on the inverted difference matrix;

and processing the data signal using the inverted first matrix.

* * * * *